US010619391B2

(12) United States Patent
Yoo et al.

(10) Patent No.: US 10,619,391 B2
(45) Date of Patent: Apr. 14, 2020

(54) APPARATUS, SYSTEM, AND METHOD FOR SEPARATING VEHICLE DOOR IN EMERGENCY

(71) Applicants: Hyundai Motor Company, Seoul (KR); Kia Motors Corporation, Seoul (KR)

(72) Inventors: Dong-Keun Yoo, Ansan-si (KR); Sang-Heon Lee, Seoul (KR); Min-Soo Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 15/831,052

(22) Filed: Dec. 4, 2017

(65) Prior Publication Data

US 2018/0171691 A1 Jun. 21, 2018

(30) Foreign Application Priority Data

Dec. 16, 2016 (KR) ........................ 10-2016-0172417

(51) Int. Cl.
*B60J 5/00* (2006.01)
*E05D 7/12* (2006.01)
*E05D 5/02* (2006.01)

(52) U.S. Cl.
CPC ........... *E05D 7/121* (2013.01); *E05D 5/0207* (2013.01)

(58) Field of Classification Search
CPC ........... E05Y 2900/531; Y10T 16/5323; Y10T 16/551; Y10T 16/547; Y10T 16/557; Y10T 16/54028; E05D 11/06; E05D 11/00
See application file for complete search history.

(56) References Cited

U.S. PATENT DOCUMENTS

| | | | | |
|---|---|---|---|---|
| 4,684,167 | A * | 8/1987 | Newmayer | B60J 5/0473 16/223 |
| 6,086,137 | A * | 7/2000 | Leschke | B60J 5/0472 296/146.1 |
| 6,676,193 | B1 * | 1/2004 | Hanagan | B60J 5/0472 296/146.11 |
| 6,808,223 | B1 * | 10/2004 | Baum | B60J 5/0472 16/366 |
| 6,820,918 | B1 * | 11/2004 | DeBono | B60J 5/0472 16/289 |

(Continued)

FOREIGN PATENT DOCUMENTS

JP 2011-501712 A 1/2011

*Primary Examiner* — Kiran B Patel

(74) *Attorney, Agent, or Firm* — Morgan, Lewis & Bockius LLP

(57) ABSTRACT

An apparatus for separating a vehicle door in an emergency, the apparatus being disposed to a hinge, which includes a hinge base disposed to a vehicle body, a hinge bracket disposed to a side of a door and overlapping with the hinge base, and a hinge bolt disposed through the hinge base and the hinge bracket, and which allows the door to be rotatable relative to the vehicle body, so that the hinge bracket is separated from the hinge base, may include a breaking member provided in the hinge bolt to break the hinge bolt when a hinge breaking signal is input to the breaking member from the outside, and a hinge bolt removal device configured to remove the hinge bolt from the hinge base and the hinge bracket when the hinge bolt is broken.

11 Claims, 11 Drawing Sheets

(56) References Cited

U.S. PATENT DOCUMENTS

| | | | | |
|---|---|---|---|---|
| 7,373,693 | B2 * | 5/2008 | Markl | E05D 11/0054 16/334 |
| 10,100,562 | B2 * | 10/2018 | Seo | B60N 3/023 |
| 10,293,667 | B2 * | 5/2019 | Gagas | B60J 5/0472 |
| 2007/0158974 | A1 * | 7/2007 | Woodhouse | B60J 5/0472 296/146.11 |
| 2007/0234520 | A1 * | 10/2007 | Faubert | E05D 3/18 16/357 |
| 2008/0083089 | A1 * | 4/2008 | Hoffman | E05D 3/10 16/367 |
| 2009/0056074 | A1 * | 3/2009 | Chase | E05D 5/062 16/321 |
| 2009/0106936 | A1 * | 4/2009 | Greenbank | E05D 5/0207 16/223 |
| 2009/0106941 | A1 * | 4/2009 | Greenbank | B60J 5/0472 16/371 |
| 2009/0133222 | A1 * | 5/2009 | Ochiai | E05D 11/1057 16/347 |
| 2011/0030171 | A1 * | 2/2011 | Hooton | E05D 3/10 16/367 |
| 2012/0000047 | A1 * | 1/2012 | Jones | F41H 5/226 29/254 |
| 2012/0246875 | A1 * | 10/2012 | Lowen | E05D 11/1071 16/337 |
| 2014/0225394 | A1 * | 8/2014 | Oyen | E05D 11/1085 296/146.11 |
| 2015/0314673 | A1 * | 11/2015 | Watterworth | B60J 5/0468 296/146.11 |
| 2017/0030126 | A1 * | 2/2017 | Elie | E05F 15/614 |
| 2017/0030131 | A1 * | 2/2017 | Elie | E05F 15/60 |
| 2018/0230725 | A1 * | 8/2018 | Vinoth Kannan | E05D 11/082 |
| 2018/0313123 | A1 * | 11/2018 | Kenyon | E05D 11/087 |
| 2018/0371813 | A1 * | 12/2018 | Cherry | E05D 11/1071 |
| 2019/0032381 | A1 * | 1/2019 | Witting | E05D 5/121 |
| 2019/0194988 | A1 * | 6/2019 | Mori | E05D 3/02 |

* cited by examiner

APPARATUS, SYSTEM, AND METHOD FOR SEPARATING VEHICLE DOOR IN EMERGENCY

CROSS-REFERENCE TO RELATED APPLICATIONS

The present application claims priority to Korean Patent Application No. 10-2016-0172417, filed on Dec. 16, 2016, the entire contents of which is incorporated herein for all purposes by this reference.

BACKGROUND OF THE INVENTION

Field of the Invention

The present invention relates to an apparatus, system, and method for separating a vehicle door from a vehicle body such that occupants are able to escape from a vehicle in an emergency.

Description of Related Art

The doors disposed to a vehicle are maintained in the state in which they are coupled to a vehicle body during the traveling of the vehicle travels to protect occupants within the vehicle, and are opened to enable the occupants to get on or off the vehicle.

These doors are typically mounted to the vehicle body such that one side of each door is connected to the vehicle body by a hinge, so that the doors are opened or closed while rotating about the hinges.

Meanwhile, the doors need to be opened or closed in an emergency, for example in a case of the overturning of the vehicle, to rescue occupants within the vehicle.

Swing doors often applied to a vehicle (doors opened to the left and right of a vehicle by hinge bolts disposed perpendicular to the ground) are unlocked by the operation of handles mounted to the doors even when the vehicle overturns. Accordingly, occupants may escape from the vehicle by opening the doors within the vehicle or may be rescued by opening the doors outside the vehicle.

However, in a vehicle provided with a door, which is vertically opened or closed, as illustrated in FIG. 1, occupants may not escape from the vehicle or may not be rescued externally since it is impossible to open the door when the vehicle overturns.

As illustrated in FIG. 1, in a vehicle 1 provided with a butterfly door 2, the door 2 is vertically opened or closed. A hinge 110 is disposed to an A-pillar of the vehicle, and is configured such that a hinge base 111 fixed to a vehicle body is connected to a hinge bracket 112 fixed to the door 2 by a hinge bolt 113. Thus, the door 2 entirely moves upward and is opened forward at the side thereof while pivoting about the hinge bolt.

However, when the vehicle 1 provided with the butterfly door 2 overturns, the door 2 may not be opened since the roof of the vehicle is in contact with the ground. Hence, it is difficult for occupants to escape or be rescued when the vehicle overturns.

This situation may also occur in vehicles provided with door including scissor doors or gull-wing doors, which are vertically opened or closed, as well as the vehicle 1 provided with the butterfly door 2.

To resolve this problem, there has been provided a technique for separating the hinge using a device including a latch, for example. However, since the door has a complicated structure and requires a large installation space due to the application of the latch, it may be difficult to apply the door to the vehicle in practice.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus, system, and method for separating a vehicle door from a vehicle body in an emergency by exploding a hinge bolt with an explosive in a hinge, which allows the vehicle door to be connected to the vehicle body, and by separating and removing the hinge bolt from the hinge.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, an apparatus for separating a vehicle door in an emergency is disposed to a hinge, which may include a hinge base disposed to a vehicle body, a hinge bracket disposed to one side of a door and overlapping with the hinge base, and a hinge bolt disposed through the hinge base and the hinge bracket, and which allows the door to be rotatable relative to the vehicle body, so that the hinge bracket is separated from the hinge base, and may include a breaking member provided in the hinge bolt to break the hinge bolt when a hinge breaking signal is input to the breaking member from the outside, and a hinge bolt removal device configured to remove the hinge bolt from the hinge base and the hinge bracket when the hinge bolt is broken.

The breaking member may be an explosive charged into the hinge bolt.

The explosive may be charged into a body of the hinge bolt, and a detonator for detonating the explosive may be provided in a head of the hinge bolt.

The body of the hinge bolt may have a breaking groove formed along a circumference thereof, and the breaking groove may have a fixed width and depth.

The breaking groove may be formed in the body while being positioned in a boundary between the hinge base and the hinge bracket when the hinge bolt is disposed through the hinge base and the hinge bracket.

The breaking groove may be formed in a portion closest to the head in a boundary between the hinge base and the hinge bracket.

The hinge bolt removal device may be disposed to elastically support the hinge bolt in a direction opposite to a direction in which a head of the hinge bolt is formed, so that the hinge bolt removal device removes a body of the hinge bolt from the hinge base and the hinge bracket when the hinge bolt is broken.

The hinge bolt removal device may include a sleeve having a space defined to accommodate the body therein, one end portion of the sleeve being fastened to the hinge base, a fastening bolt positioned at one end portion of the sleeve and fastened to the other end portion of the hinge bolt, a fixed nut positioned at the other end portion of the sleeve, and a spring configured to elastically support the fastening bolt toward the fixed nut while both end portions of the spring are connected to the fastening bolt and the fixed nut.

The fixed nut may be screwed to an internal peripheral surface of the sleeve.

The fixed nut may be initially positioned adjacent to the fastening bolt, and the fixed nut may elastically support the fastening bolt toward the fixed nut while rotating in the sleeve to be positioned adjacent to the other end portion of the sleeve in an assembly process.

The spring may be disposed in the sleeve in a tensile state.

The door may be a door which is vertically opened or closed so that the door is opened upward when it is opened.

The door may be one of a butterfly door, a scissor door, and a gull-wing door.

In accordance with various exemplary embodiments of the present invention, a system for separating a vehicle door in an emergency may include the apparatus for separating a vehicle door in an emergency, and a controller configured to generate a hinge breaking signal and operate the breaking member.

When an overturning detector for detecting overturning of the vehicle detects that the vehicle overturns, the controller may generate the hinge breaking signal.

When the overturning detector for detecting overturning of the vehicle detects that the vehicle overturns, the controller may generate the hinge breaking signal after a predetermined time.

When it is detected that an operation switch disposed in the vehicle is operated, the controller may generate the hinge breaking signal.

In accordance with various exemplary embodiments of the present invention, a method of separating a vehicle door in an emergency may include generating a hinge breaking signal by a controller to break a hinge bolt in a hinge, which allows a door to be connected to a vehicle body, so that the door is separated from the vehicle body, separating a head and a body of the hinge bolt from each other by detonating an explosive charged in the hinge bolt by a detonator when the hinge breaking signal is input to the detonator, removing the body, which is separated from the head, from the hinge to separate the hinge into a hinge base disposed to the vehicle body and a hinge bracket disposed to the door, and separating the door from the vehicle body.

In the generating a hinge breaking signal by a controller, the hinge breaking signal may be generated from an overturning detector for detecting overturning of the vehicle and be input to the controller.

The controller nay output the hinge breaking signal after a predetermined time after the overturning detector detects that the vehicle overturns.

In the generating a hinge breaking signal by a controller, the hinge breaking signal may be generated from an operation switch disposed in the vehicle and be input to the controller.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6A, FIG. 6B, and FIG. 6C are cross-sectional views illustrating a process of assembling the apparatus for separating a vehicle door in an emergency according to the exemplary embodiment of the present invention, wherein FIG. 6A is a cross-sectional view illustrating a state in which a hinge bolt is fitted to a hinge base and a hinge bracket, FIG. 6B is a cross-sectional view illustrating a state in which a hinge bolt removal device is initially assembled to the hinge bolt, and FIG. 6C is a cross-sectional view illustrating a state in which the assembly of the hinge bolt removal device to the hinge bolt is completed such that the hinge bolt removal device elastically supports the hinge bolt in a direction in which the hinge bolt removal device pulls the hinge blot.

FIG. 7A and FIG. 7B are cross-sectional views illustrating a state of operation of the apparatus for separating a vehicle door in an emergency according to the exemplary embodiment of the present invention, wherein FIG. 7A is a cross-sectional view illustrating a state in which the hinge bolt is broken immediately after an explosive is ignited, and FIG. 7B is a cross-sectional view illustrating a state in which the broken hinge bolt is removed from the hinge by the hinge bolt removal device.

Figure 1:
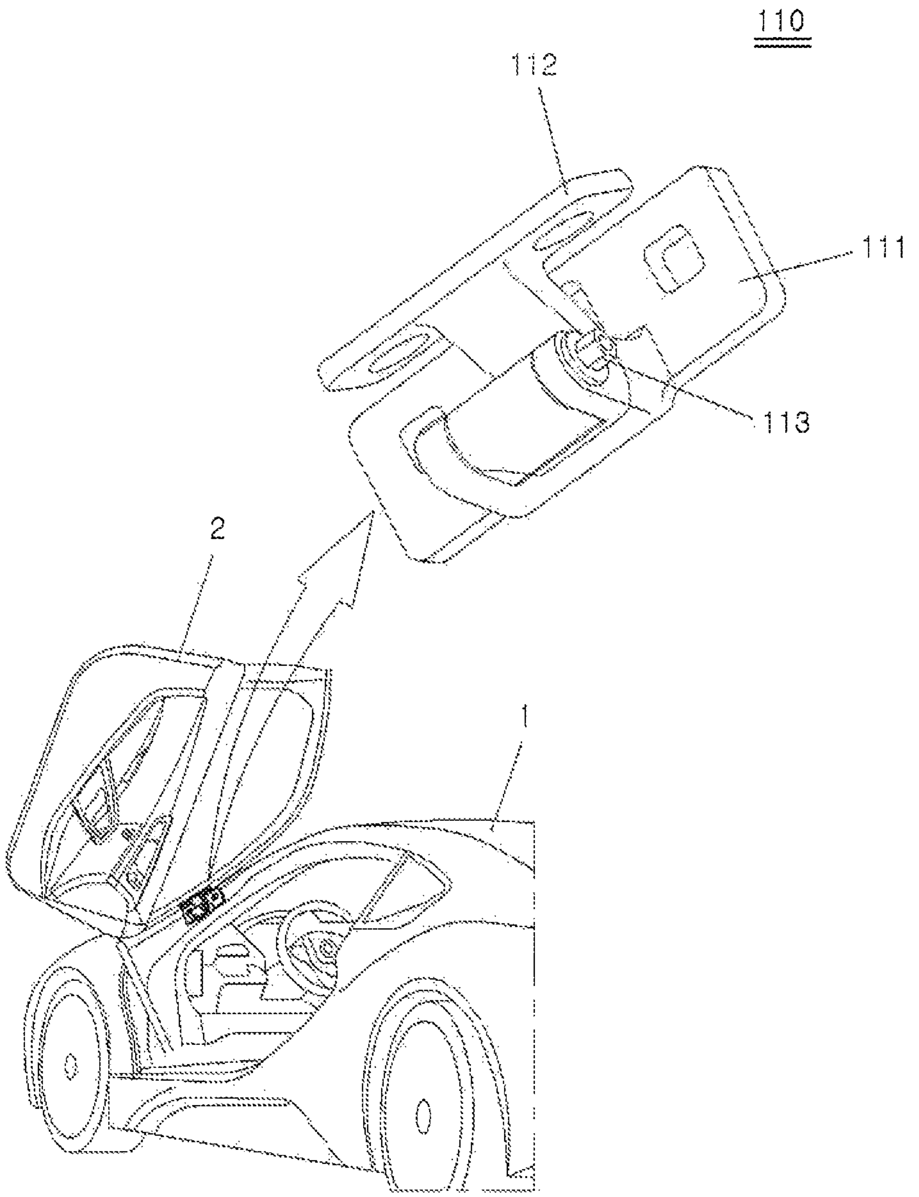
FIG. 1 is a perspective view illustrating a state in which a butterfly door is opened from a vehicle provided with the same.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An apparatus for separating a vehicle door in an emergency according to an exemplary embodiment of the present invention is applied to a hinge that allows a door 2 to be connected to a vehicle body, and operates in an emergency, for example in a case of the overturning of a vehicle 1, such that the door 2 is separated from the vehicle 1.

Figure 2:
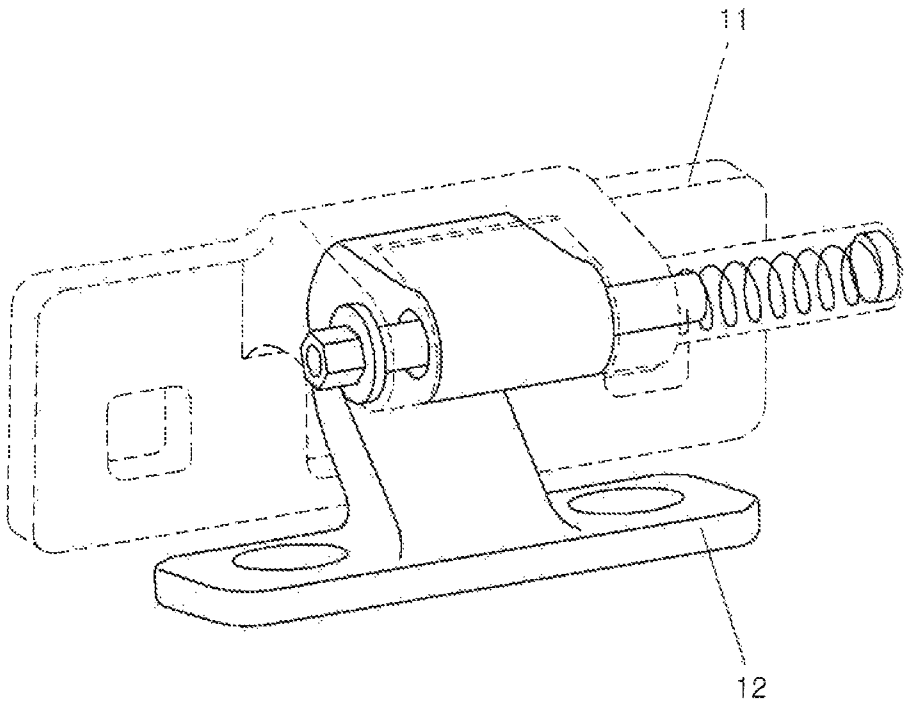
FIG. 2 is a perspective view illustrating an apparatus for separating a vehicle door in an emergency according to an exemplary embodiment of the present invention.
Figure 3:
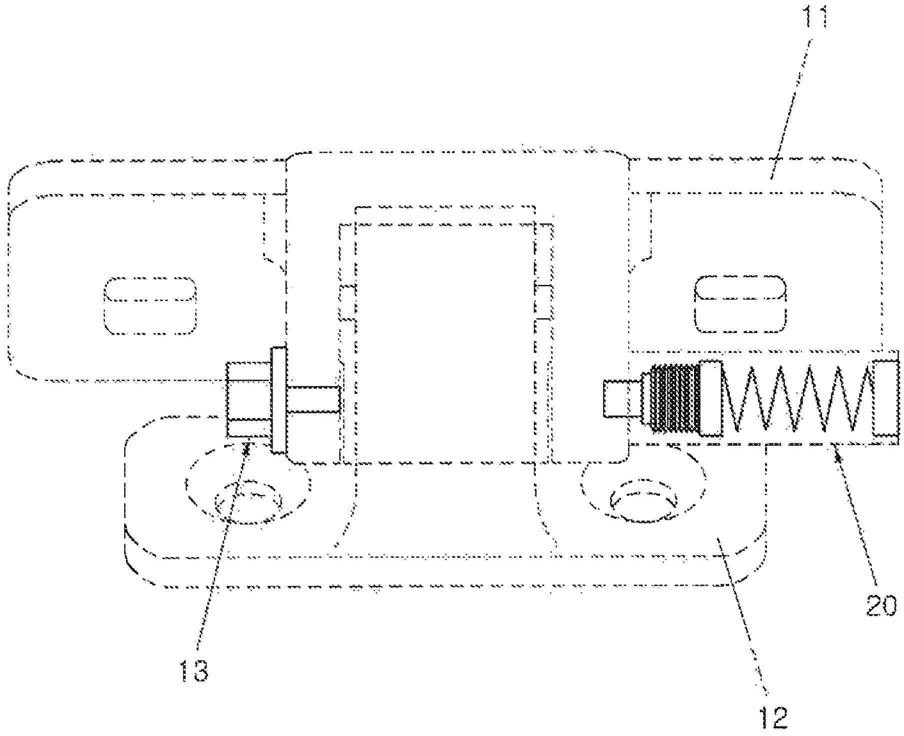
FIG. 3 is a front view illustrating the apparatus for separating a vehicle door in an emergency according to the exemplary embodiment of the present invention.
Figure 4:
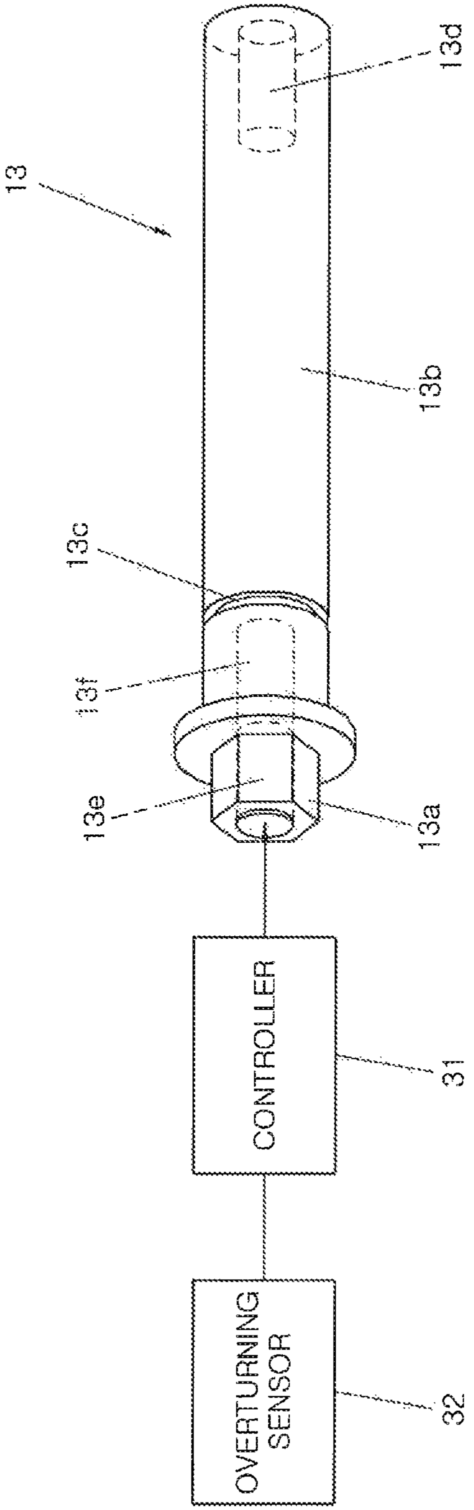
FIG. 4 is a perspective view illustrating a hinge bolt structure in the apparatus for separating a vehicle door in an emergency according to the exemplary embodiment of the present invention.

FIG. 2 illustrates the hinge to which the apparatus for separating a vehicle door in an emergency according to the exemplary embodiment of the present invention is applied. The hinge includes a hinge base 11 which is disposed to the vehicle body, a hinge bracket 12 which is disposed to one side of the door and overlaps with the hinge base 11, and a hinge bolt 13 which is disposed through the hinge base 11 and the hinge bracket 12. The door 2 may be opened or closed from the vehicle body by rotating the hinge bracket 12 about the hinge bolt 13.

The hinge enables the door to be separated from the vehicle body in an emergency, i.e. When the door may not be normally opened due to the overturning of the vehicle.

Swing type doors applied to most vehicles may be opened from the inside or outside of the vehicle even though the vehicles overturn. On the other hand, doors including butterfly doors, scissor doors, or gull-wing doors, which are vertically opened or closed, may not be normally opened due to the ground when vehicles overturn, and hence it is impossible to extricate or rescue an occupant.

To resolve the present matter, the hinge, which allows the door to be connected to the vehicle body, is configured to be separated in an emergency so that the occupant may escape or be rescued in the emergency, for example in a case of the overturning of the vehicle. Especially, since the hinge is applied to a door which is vertically opened or closed, it enables the door to be separated from the vehicle body in an emergency.

To this end, the apparatus includes a breaking member which is provided in the hinge bolt 13 to break the hinge bolt 13 when a signal is input to the breaking member from the outside, and a hinge bolt removal device 20 that removes the hinge bolt 13 from the hinge when the hinge bolt 13 is broken by the breaking member.

The breaking member may be an explosive 13*f* that detonates in a moment when a detonation signal is input to the breaking member from the outside. That is, the hinge bolt 13 is broken by detonating the explosive 13*f* which is placed into the hinge bolt 13.

The hinge bolt 13 includes a head 13*a* and a body 13*b* that extends from the head 13*a*. The head 13*a* is positioned outside the hinge base 11, and the body 13*b* passes through the hinge base 11 and the hinge bracket 12. In the instant case, when the explosive 13*f* charged into the body 13*b* is detonated, the hinge bolt 13 is broken such that the body 13*b* is separated from the head 13*a* or is broken at the fixed position of the body 13*b*.

To this end, the body 13*b* has a breaking groove 13*c* which is formed along the circumference of the body 13*b* and has a fixed width and depth. Since the portion in which the breaking groove 13*c* is formed in the body 13*b* is weaker than other portions thereof, it is possible to induce the hinge bolt 13 to be broken at the breaking groove 13*c*.

Meanwhile, the breaking groove 13*c* is preferably positioned in the boundary between the hinge base 11 and the hinge bracket 12 when the hinge bolt 13 is disposed through the hinge base 11 and the hinge bracket 12. That is, on the basis of the breaking groove 13*c*, one side of the body 13*b* is positioned in the hinge base 11 while the other side thereof is positioned in the hinge bracket 12.

The breaking groove 13*c* is preferably formed in a portion closest to the head 13*a* in the boundary between the hinge base 11 and the hinge bracket 12. This is configured to reduce the head 13*a* and a portion connected to the head 13*a* on the basis of the breaking groove 13*c* to discharge a remaining portion out of the hinge by the hinge bolt removal device 20 and easily separate the hinge base 11 from the hinge bracket 12.

The hinge bolt 13 has a detonator 13*e* which is provided in the head 13*a* or a portion adjacent to the explosive 13*f* to detonate the explosive 13*f* When the detonator 13*e* receives a signal for breaking the hinge bolt 13 from the outside, the detonator 13*e* ignites and detonates the explosive 13*f*.

The hinge bolt removal device 20 is configured to remove the broken hinge bolt 13 from the hinge. If a portion of the hinge bolt 13 remains in the hinge, in the boundary between the hinge base 11 and the hinge bracket 12 even though the hinge bolt 13 is broken by the breaking member, it is impossible to separate the door from the vehicle body since the hinge base 11 is not separated from the hinge bracket 12.

Accordingly, the hinge bolt removal device 20 perfectly removes and discharges the hinge bolt 13 from the hinge to the outside when the hinge bolt 13 is broken, and thus it is possible to enhance the reliable separation between the hinge base 11 and the hinge bracket 12.

The hinge bolt removal device 20 is disposed to elastically support the hinge bolt 13 in a direction opposite to the direction in which the head 13*a* of the hinge bolt 13 is formed. The hinge bolt removal device 20 removes the body 13*b* of the hinge bolt 13 from the hinge base 11 and the hinge bracket 12 when the hinge bolt 13 is broken, so that the hinge base 11 is separated from the hinge bracket 12.

Hereinafter, the detailed configuration of the hinge bolt removal device 20 will be described.

The hinge bolt removal device 20 includes a sleeve 21 that has a space 21*a* defined therein to accommodate the body 13*b* and is fastened, at one end portion 21*b* thereof, to the hinge base 11, a fastening bolt 22 which is positioned at one end portion of the sleeve 21 and is fastened to the other end portion of the hinge bolt 13, a fixed nut 24 which is positioned at the other end portion 21*c* of the sleeve 21, and a spring 23 that elastically supports the fastening bolt 22 toward the fixed nut 24 while both end portions of the spring 23 are connected to the fastening bolt 22 and the fixed nut 24.

The sleeve 21 has a cylindrical shape to accommodate the body 13*b* of the hinge bolt 13, the fastening bolt 22, the spring 23, and the fixed nut 24 therein. One end portion of the sleeve 21 may be fastened to the hinge, e.g., the hinge base 11. The sleeve 21 may be disposed on the same axis as the hinge bolt 13. The sleeve 21 has a thread formed on the internal peripheral surface thereof.

Figure 6A:
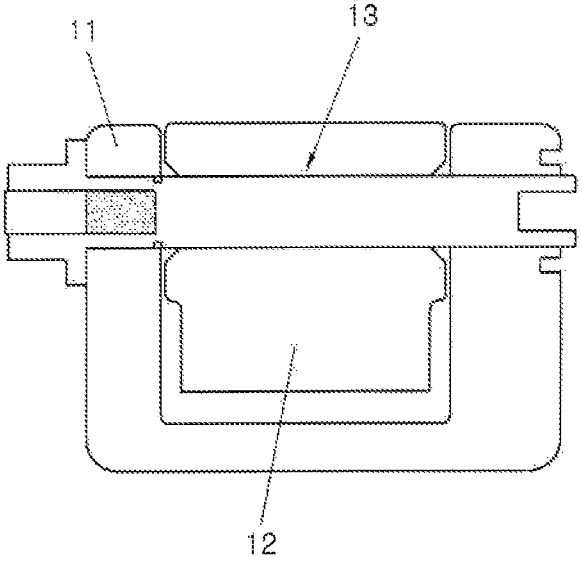

The fastening bolt 22 is positioned at one end portion of the sleeve 21 and is fastened to the other end portion of the hinge bolt 13 (to the opposite side of the head) (see FIG. 6A). The hinge bolt 13 has a fastening groove 13*d* formed in the other end portion thereof, and the fastening bolt 22 is screwed into the fastening groove 13*d*. Although the fastening bolt 22 is screwed to the other end portion of the hinge bolt 13, it is not restricted by the sleeve 21.

The fixed nut 24 is positioned at the other end portion of the fastening bolt 22, i.e. at the side facing the fastening bolt 22, within the sleeve 21. The fixed nut 24 has a thread formed on the external peripheral surface thereof to be screwed to the sleeve 21.

Both end portions of the spring 23 are positioned between the fastening bolt 22 and the fixed nut 24 to exhibit an elastic force such that the fastening bolt 22 and the fixed nut 24 move close to each other.

Figure 6B:
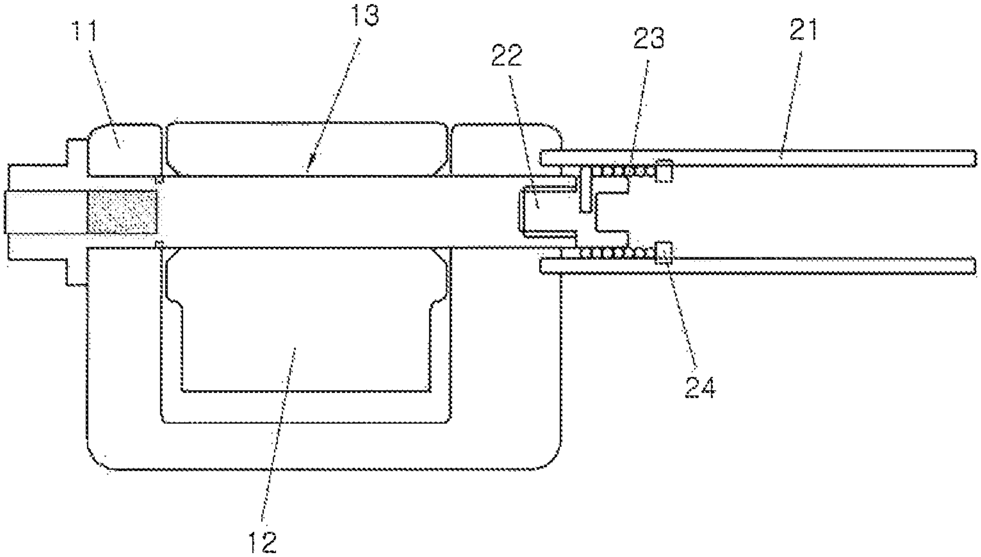
Figure 6C:
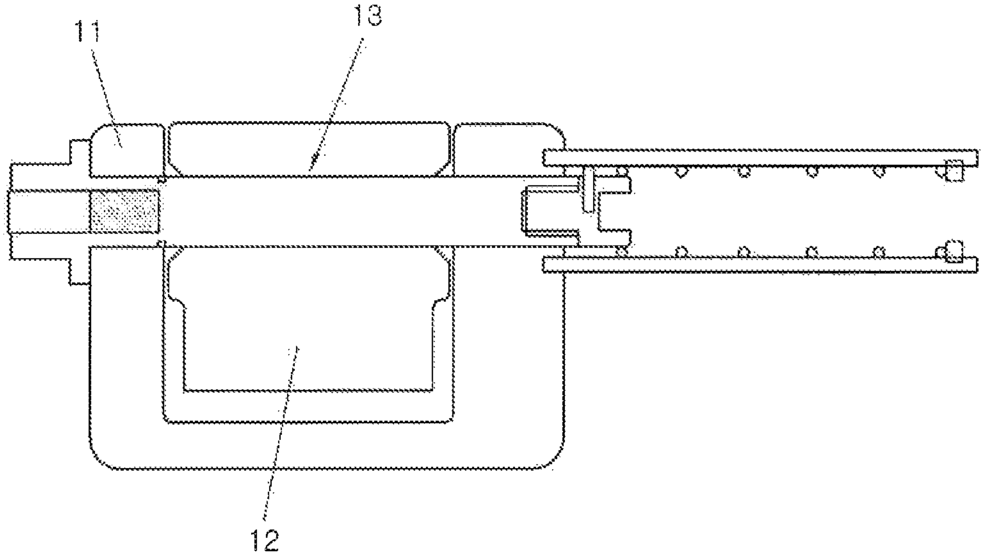
Figure 7A:
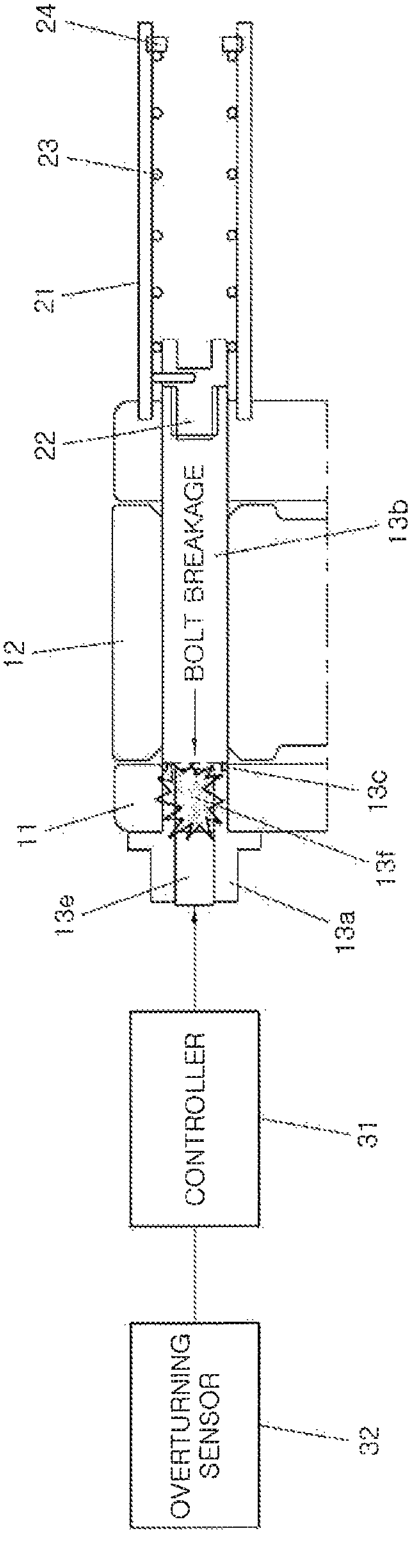
Figure 7B:
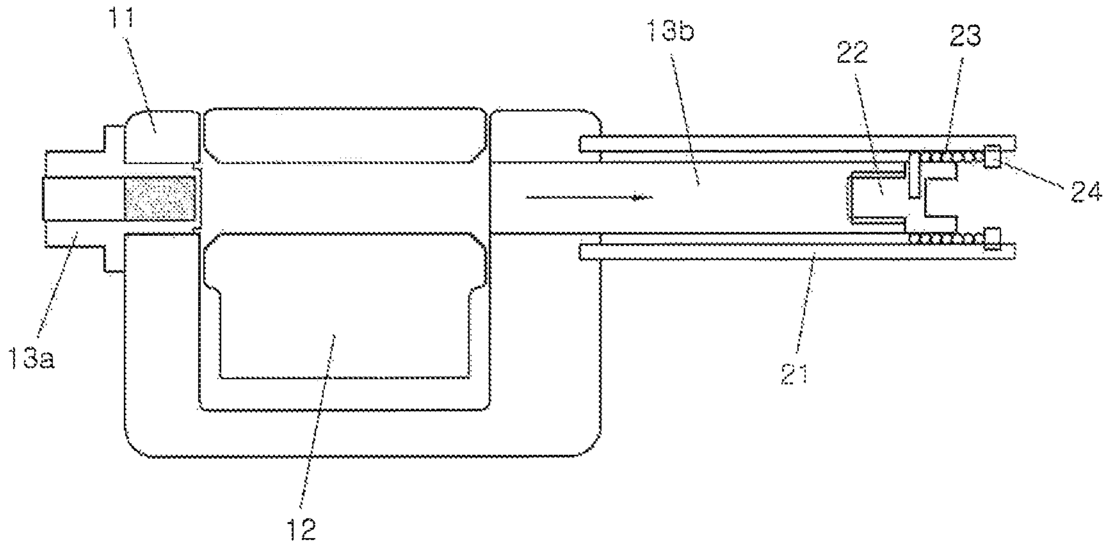

Although the fixed nut 24 is positioned adjacent to the fastening bolt 22 in an initial state (see FIG. 6B), it rotates and moves to the other end portion of the sleeve 21 in an assembly process (see FIG. 6C). Through such a structure, the spring 23 is tensioned in the initial state, and therefore exhibits an elastic force such that the fastening bolt 22 and the fixed nut 24 move close to each other. Accordingly, when the hinge bolt 13 is broken (see FIG. 7A), the spring 23 pulls the body 13*b* of the hinge bolt 13 toward the fixed nut 24 (see FIG. 7B) so that the hinge bolt 13 is separated from the hinge.

The fixed nut 24 has a through-hole formed in the center thereof such that a tool for fastening the fastening bolt 22 to the hinge bolt 13 is inserted or withdrawn through the through-hole.

A system for separating a vehicle door in an emergency according to another exemplary embodiment of the present invention utilizes the apparatus for separating a vehicle door in an emergency described above.

The system for separating a vehicle door in an emergency according to another exemplary embodiment of the present invention receives a signal for driving the apparatus for separating a vehicle door in an emergency and controls the operation of the apparatus.

The system includes a controller 31 that generates a hinge breaking signal and operates the breaking member of the apparatus in a response to the hinge breaking signal. The controller 31 generates the hinge breaking signal, namely a signal for detonating the breaking member (i.e. The explosive 130. The signal generated by the controller 31 is transmitted to the detonator 13*e* of the hinge bolt 13, and the detonator 13*e* ignites and detonates the explosive 13*f.*

Meanwhile, for the controller 31 to generate the hinge breaking signal, it is necessary to determine whether the controller 31 generates the hinge breaking signal.

Figure 5:
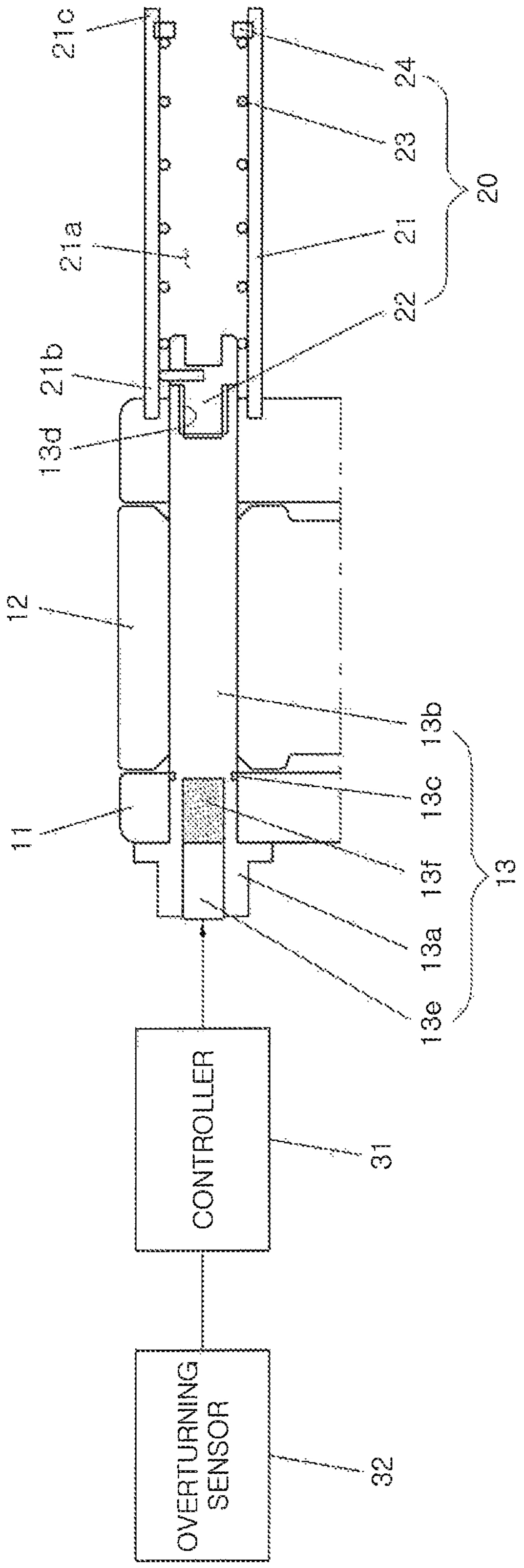
FIG. 5 is a cross-sectional view illustrating a system for separating a vehicle door in an emergency according to another exemplary embodiment of the present invention.

By way of example, the system may include an overturning detector 32 which is disposed in the vehicle to detect the overturning of the vehicle, as illustrated in FIG. 5. When the vehicle, including the door which is vertically opened or closed, overturns, the door may not be opened or closed. Therefore, when the overturning detector 32 detects the overturning of the vehicle and outputs the detected result to the controller 31, the controller 31 generates the hinge breaking signal.

In the instant case, the controller 31 preferably generates the hinge breaking signal after a predetermined time even though the overturning detector 32 detects the overturning of the vehicle. Even when the vehicle overturns, it is not perfectly stopped and may slide on the road. Therefore, the controller 31 generates the hinge breaking signal after a predetermined time after the overturning.

Figure 8:
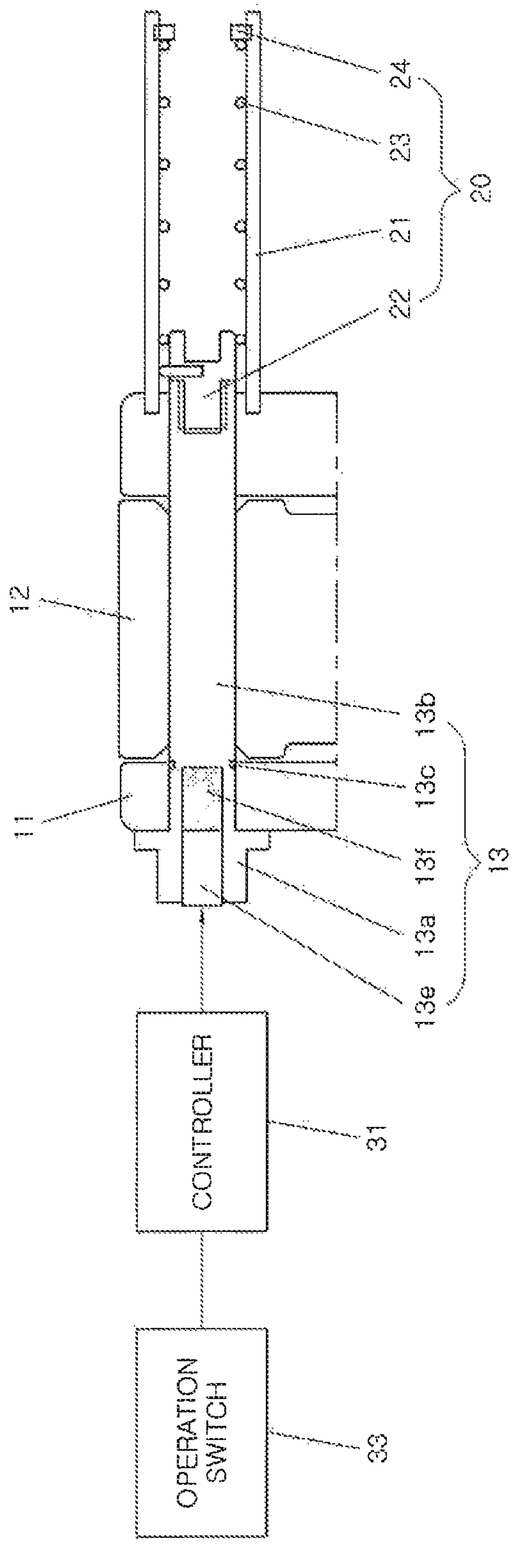
FIG. 8 is a perspective view illustrating the system for separating a vehicle door in an emergency according to another exemplary embodiment of the present invention.
Figure 9:
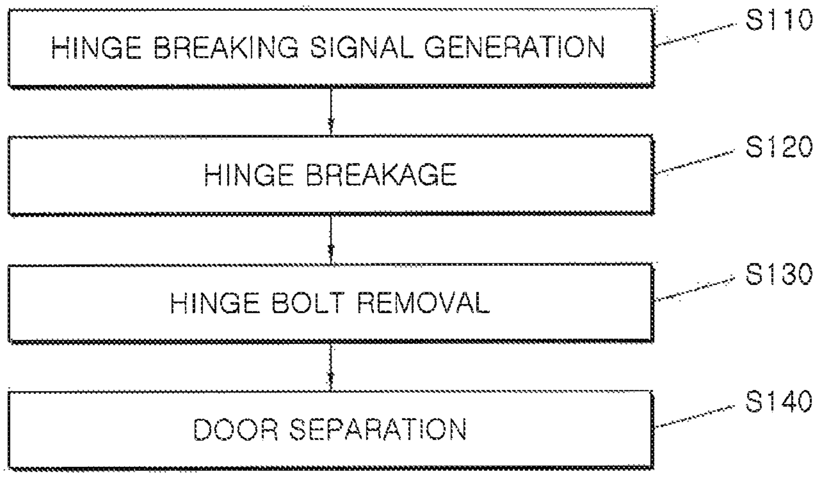
FIG. 9 is a flowchart illustrating a method of separating a vehicle door in an emergency according to a further exemplary embodiment of the present invention.

Meanwhile, when the controller 31 receives an operation signal from an operation switch 33 disposed in the vehicle, the controller 31 may also generate the hinge breaking signal, as illustrated in FIG. 8. When the occupant operates the operation switch 33 disposed in the vehicle to escape therefrom, the controller 31 generates the hinge breaking signal so that the door is separated from the vehicle body.

Meanwhile, a method of separating a vehicle door in an emergency according to a further exemplary embodiment of the present invention is embodied using the apparatus and system for separating a vehicle door in an emergency described above.

The method of separating a vehicle door in an emergency according to the further embodiment of the present invention includes a hinge breaking signal generation step S110 of generating a hinge breaking signal by a controller 31 to break a hinge bolt 13 in a hinge, which allows a door to be connected to a vehicle body, such that the door is separated from the vehicle body, a hinge breakage step S120 of separating a head 13*a* and a body 13*b* of the hinge bolt 13 from each other by detonating an explosive 13*f* charged in the hinge bolt 13 using a detonator 13*e* when the hinge breaking signal is input to the detonator 13*e*, a hinge bolt removal step S130 of removing the body 13*b*, which is separated from the head 13*a*, from the hinge to separate the hinge into a hinge base 11 disposed to the vehicle body and a hinge bracket 12 disposed to the door, and a door separation step S140 of separating the door from the vehicle body.

The hinge breaking signal generation step S110 is a step of generating the hinge breaking signal by the controller 31 to break the hinge bolt 13 in the hinge, which allows the door to be connected to the vehicle body, such that the door is separated from the vehicle body.

The hinge breaking signal generation step S110 may be performed when it is determined that it is necessary to break the hinge bolt 13 of the hinge. The present step may be performed by information acquired from a detector disposed in the vehicle or by the operation of an occupant.

That is, when an overturning detector 32 disposed in the vehicle detects the overturning of the vehicle, the hinge breaking signal may be generated. When the overturning detector 32 disposed in the vehicle detects the overturning of the vehicle and outputs the detected result to the controller 31, the controller 31 generates the hinge breaking signal. In the instant case, the controller 31 may generate the hinge breaking signal after a predetermined time even though the overturning detector 32 detects the overturning of the vehicle. The vehicle is not in a stable state (is in an immovable state), and may slide on the road by inertia immediately after the vehicle overturns. Therefore, the controller 31 may generate the hinge breaking signal after a predetermined time after the overturning detector detects the overturning of the vehicle.

Meanwhile, an operation switch 33, which is operable by a driver, may be disposed in the vehicle. When the occupant presses the operation switch 33, the signal of the operation switch 33 is output to the controller 31 so that the controller 31 generates the hinge breaking signal.

In the hinge breakage step S120, the controller 31 outputs the hinge breaking signal to the detonator 13*e* so that the detonator 13*e* detonates the explosive 13*f* charged in the hinge bolt 13. When the explosive 13*f* is detonated, the head 13*a* and the body 13*b* of the hinge bolt 13 may be instantaneously separated from each other by the explosive power of the explosive 13*f.*

In the hinge bolt removal step S130, when the hinge bolt 13 is broken, the hinge bolt removal device 20 pulls the body 13*b* of the hinge bolt 13 and perfectly removes the hinge bolt 13 from the hinge. When the spring 23 pulls the fastening bolt 22 by the hinge bolt removal device 20 in the state in which the hinge bolt 13 is broken, the hinge bolt 13 is perfectly removed from the hinge base 11 and the hinge bracket 12.

In the door separation step S140, when the hinge bolt is removed from the hinge base 11 and the hinge bracket 12, the door is separated from the vehicle body.

Accordingly, the door may be separated from the vehicle body by separating the hinge base 11 from the hinge bracket 12 in an emergency in which the door is not opened, and thus occupants can escape from or be rescued from the vehicle.

In accordance with an apparatus, system, and method for separating a vehicle door in an emergency according to exemplary embodiments of the present invention, when a vehicle overturns, it is possible to extricate or rescue occupants by breaking a hinge bolt with an explosive in a hinge, which allows a door to be connected to a vehicle body, and by separating the door from the vehicle body.

Since the hinge bolt is broken and then removed from the hinge, the separation of the door from the vehicle body is not interrupted due to a portion of the hinge bolt remaining in the hinge.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for separating a vehicle door from a vehicle body in an emergency, the apparatus being mounted to a hinge, which includes a hinge base mounted to the vehicle body, a hinge bracket mounted to a side of the vehicle door and mounted on the hinge base, and a hinge bolt mounted through the hinge base and the hinge bracket, and which allows the vehicle door to be rotatable relative to the vehicle body, the hinge bracket being configured to be separated from the hinge base in the emergency, the apparatus comprising:

a breaking member provided in the hinge bolt to break the hinge bolt when a signal to break the hinge bolt is input to the breaking member; and a hinge bolt removal device mounted to the hinge and configured to remove the broken hinge bolt from the hinge base and the hinge bracket when the hinge bolt is broken according to the signal.

2. The apparatus of claim 1, wherein the breaking member is an explosive charged into the hinge bolt.

3. The apparatus of claim 2, wherein the explosive is mounted into a body of the hinge bolt; and a detonator for detonating the explosive is provided in a head of the hinge bolt, wherein the single to break the hinge bolt is configured to be input to the detonator.

4. The apparatus of claim 3, wherein the body of the hinge bolt has a breaking groove formed along a circumference of the body of the hinge bolt, and the breaking groove has a predetermined width and depth along the circumference of the body of the hinge bolt.

5. The apparatus of claim 4, wherein the breaking groove is positioned the body of the hinge bolt adjacent to a boundary between the hinge base and the hinge bracket when the hinge bolt is mounted through the hinge base and the hinge bracket.

6. The apparatus of claim 4, wherein the boundary is positioned adjacent to the head of the hinge bolt, and wherein the breaking groove is formed in a portion of the body adjacent to the head in the boundary between the hinge base and the hinge bracket.

7. The apparatus of claim 1, wherein the hinge bolt removal device is mounted to the hinge to elastically bias the hinge bolt in a first direction opposite to a second direction in which a head of the hinge bolt is mounted, so that the hinge bolt removal device removes a body of the hinge bolt from the hinge base and the hinge bracket when the hinge bolt is broken according to the signal.

8. The apparatus of claim 7, wherein the hinge bolt removal device includes:

a sleeve having a space defined to accommodate the body therein, a first end portion of the sleeve being fastened to the hinge base;

a fastening bolt mounted at the first end portion of the sleeve and fastened to the hinge bolt;

a fixed nut fixed at a second end portion of the sleeve; and an elastic member, wherein each of first and second end portions of the elastic member is connected to the fastening bolt and the fixed nut, respectively and the elastic member is configured to elastically bias tire fastening bolt toward the fixed nut.

9. The apparatus of claim 8, wherein the fixed nut is screwed to an internal peripheral surface of the sleeve at the second end portion of the sleeve.

10. The apparatus of claim 9, wherein the fixed nut is initially disposed adjacent to the fastening bolt, and the fixed nut elastically supports the fastening bolt toward the fixed nut while rotating in the sleeve to be disposed adjacent to the second end portion of the sleeve in an assembly process.

11. The apparatus of claim 1, wherein the vehicle door is configured to be vertically opened from or closed to the vehicle body so that the vehicle door is opened upward from the vehicle body when the vehicle door is to be opened.

* * * * *